United States Patent [19]

Johnson

[11] Patent Number: 4,867,955
[45] Date of Patent: Sep. 19, 1989

[54] METHOD OF DESULFURIZING COMBUSTION GASES

[75] Inventor: Neil H. Johnson, Grosse Ile, Mich.

[73] Assignee: Detroit Stoker Company, Monroe, Mich.

[21] Appl. No.: 212,000

[22] Filed: Jun. 27, 1988

[51] Int. Cl.$^4$ .......................... B01J 8/00; C01B 17/00
[52] U.S. Cl. ..................................... 423/244; 423/242
[58] Field of Search ........... 423/244 A, 244 R, 242 R, 423/242 A

[56] References Cited

U.S. PATENT DOCUMENTS

| | | | |
|---|---|---|---|
| 2,718,453 | 9/1955 | Beckman | 423/244 |
| 3,481,289 | 12/1969 | Oda et al. | 110/1 |
| 3,746,498 | 7/1973 | Stengel | 431/4 |
| 3,807,090 | 4/1974 | Moss | 48/228 |
| 4,185,080 | 1/1980 | Rechmeier | 423/242 |
| 4,309,393 | 1/1982 | Nguyen | 423/244 |
| 4,322,218 | 3/1982 | Nozaki | 44/15 R |
| 4,333,909 | 6/1982 | Stewart et al. | 422/141 |
| 4,346,064 | 8/1982 | Leon | 423/244 |
| 4,387,653 | 6/1983 | Voss | 110/342 |
| 4,439,406 | 3/1984 | Stewart et al. | 423/244 |
| 4,440,100 | 4/1984 | Michelfelder et al. | 110/343 |
| 4,461,224 | 7/1984 | Michelfelder et al. | 110/345 |
| 4,503,785 | 3/1985 | Scocca | 110/342 |
| 4,509,436 | 4/1985 | Schrofelbauer et al. | 110/345 |
| 4,517,165 | 5/1985 | Moriarty | 423/244 |
| 4,519,324 | 5/1985 | Toth | 110/347 |
| 4,519,995 | 5/1985 | Schrofelbauer et al. | 423/244 |
| 4,523,532 | 6/1985 | Moriarty et al. | 110/347 |
| 4,555,392 | 11/1985 | Steinberg | 423/244 |
| 4,555,996 | 12/1985 | Torbov et al. | 110/345 |
| 4,603,037 | 7/1986 | Yoon | 423/244 |

*Primary Examiner*—Gregory A. Heller
*Attorney, Agent, or Firm*—Harness, Dickey & Pierce

[57] ABSTRACT

Desulfurization of combustion gases is maximized by calcining a calcinable compound within the combustion chamber under optimal conditions for calcination, processing the calcined product with flyash produced by combustion to form a highly reactive absorbent, and treating the combustion gases with the absorbent to remove sulfur-containing gaseous products of combustion therefrom.

14 Claims, 4 Drawing Sheets

METHOD OF DESULFURIZING COMBUSTION GASES

BACKGROUND OF THE INVENTION

The present invention relates generally to a method of decreasing gaseous pollutants released into the atmosphere, and, more particularly, to a method of desulfurizing combustion gases produced by the burning of a sulfur-containing fuel.

The ever-increasing awareness that sulfurous gaseous pollutants may pose a significant environmental risk has led to governmental regulation of acceptable levels of sulfur which can be released into the atmosphere. As a result, various schemes for desulfurizing gaseous products of combustion of sulfur-containing fuels, hereinafter referred to as combustion gases, have been developed to reduce the levels of sulfur in combustion gases released into the atmosphere.

Most methods for desulfurizing combustion gases have focused on the addition of sulfur-capturing oxide compounds such as calcium oxide (lime) and magnesium oxide into the combustion chamber. These compounds react with sulfurous gases produced during combustion to form solid sulfur-containing products which can be filtered out from the gases released into the atmosphere. Enhancement of desulfurization by these additives has also been achieved by slaking the oxide compounds to form their hydroxides which more effectively capture sulfur from the combustion gases.

Although additives such as calcium oxide and magnesium oxide are quite effective in removing sulfur from combustion gases, these compounds are relatively expensive and their use on a large commercial scale is cost-prohibitive. Thus, less expensive additives such as calcium carbonate or magnesium carbonate, or these compounds in the raw state, i.e. limestone and dolomite, are more feasible for large-scale use from a cost standpoint. Although less expensive, however, these additives suffer from a low efficacy rate of sulfur removal and thus require use of inordinately large stoichiometric amounts of additive. The use of such large amounts drives up the cost and creates additional problems such as disposal of spent additives.

It would thus be advantageous to provide a relatively inexpensive and simple process which optimizes the conversion of carbonate compounds to their more reactive oxides and results in substantial desulfurization of combustion gases by these compounds.

SUMMARY OF THE INVENTION

The present invention generally comprises a method of desulfurizing gaseous products of combustion by:

burning a sulfur-containing solid fuel within a combustion chamber to produce flyash and combustion gases comprising a sulfurous gas;

heating a particulate calcinable compound comprising a compound selected from the group consisting of the carbonates of magnesium, calcium, sodium, and mixtures thereof, in a selected temperature zone within the combustion chamber for a residence time sufficient for calcination of the calcinable compound to its respective oxide, wherein the particle size of the calcinable compound, the selected temperature zone and the residence time are selected to effect calcination of a substantial amount of the calcinable compound to its respective oxide;

removing the oxide of the calcinable compound from the combustion chamber;

removing the combustion gases from the combustion chamber; and treating the removed combustion gases with the oxide to remove a substantial amount of the sulfurous gas from the combustion gases.

DETAILED DESCRIPTION OF THE PREFERRED EMBODIMENTS

In general, the method of the present invention is a method for desulfurizing combustion gases by calcining a particulate calcinable carbonate compound within a combustion chamber, removing the calcined product from the chamber, and treating the combustion gases with the calcined product to remove sulfur therefrom. Preferably, the calcined product and flyash are hydrated under appropriate conditions to form an absorbent used to treat the combustion gases.

Figure 1:
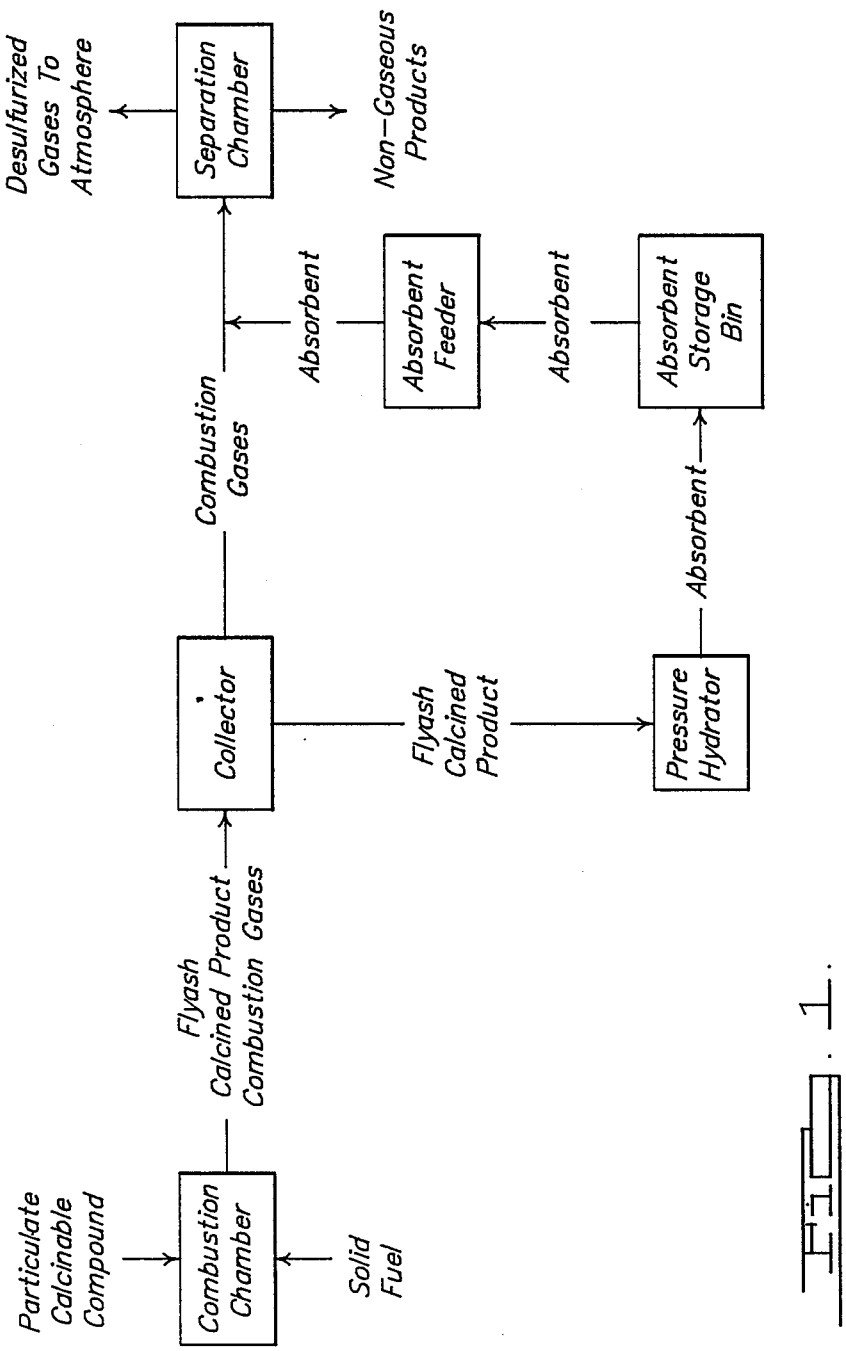
FIG. 1 is a schematic representation of a preferred embodiment of the method of the present invention for desulfurizing combustion gases.

Referring now to FIG. 1, a schematic representation of a preferred embodiment of the method of the present invention is depicted. As shown in FIG. 1, a particulate calcinable compound is injected into the combustion chamber of a solid fuel furnace during combustion of the fuel. The calcinable compound injected into the chamber is a compound selected from the group consisting of the carbonates of calcium, magnesium and sodium, and mixtures thereof. A calcinable compound or mixture which contains calcium such as, for example, limestone is preferred.

The reaction conditions under which the particulate calcinable compound is injected are selected for efficient calcination of the compound. By efficient calcination is meant the highest degree of calcination of the compound to its respective oxide which can be achieved at an acceptable cost and given the physical limitations of the equipment. The reaction conditions for efficient calcination are selected to achieve calcination of a substantial amount of the calcinable compound to its respective oxide.

The reaction conditions of the method of the present invention include the particle size of the calcinable compound, the temperature zone of the combustion chamber into which the calcinable compound is injected, and its residence time in the temperature zone. The reaction conditions are interdependent and must be selected in light of each other to achieve calcination of at least about 75% the calcinable compound to its respective oxide. If cost is of no concern, the particle size, temperature zone and residence time can be selected to achieve the highest possible degree of calcination of the injected compound.

With respect to particle size, since temperatures above those necessary for calcination may deactivate or ingite the calcinable compound, the particle size must be such that the particles remain suspended in the selected temperature zone for a sufficient residence time without descending into higher temperatures zones within the combustion chamber. Broadly speaking, the smaller the size of the injected particle, the higher the degree of calcination achieved. However, since one of the features of the method of the present invention is the reduction of costs attending desulfurization, substantial calcination may be achieved by the injection of less costly larger-sized particles of the compound, even though smaller particles might result in a somewhat higher percentage of calcination of the compound. Suitable particle sizes for limestone, for example, are those less than about 2000 $\mu$m, preferably, in the range of from about 10 to about 110 $\mu$m in diameter, and, taking cost into account, more preferably, in the range of from about 74 $\mu$m to about 106 $\mu$m (i.e., 140-200 mesh ASTM).

After the appropriate particle size is selected, the particulate calcinable compound is injected into the combustion chamber at the elevation containing the temperature zone selected for optimal calcination. The temperature in the selected zone must be high enough to achieve substantial calcination of the compound, yet low enough not to deactivate or ignite the calcinable compound. For example, if limestone is used, a suitable temperature zone for injection in a solid fuel bed furnace is in the range of from about 1800° to about 2200° F., and more preferably in the range of from about 1900° to about 2100° F.

With respect to the residence time of the calcinable compound injected in the chamber, under appropriate conditions, calcination of the compound generally occurs within a matter of seconds. Although in general, the greater the residence time, the higher the degree of calcination, the residence time selected for efficient calcination must be short enough to prevent or minimize the descent of the particles of the injected compound into higher temperature zones. For limestone, for example, a suitable residence time is two seconds or less, preferably in the range of from about 1.5 to about 0.1 seconds, and more preferably in the range of from about 0.5 to about 1.2 seconds.

Referring to FIG. 1, after calcination of the compound under the selected reaction conditions for efficient calcination has occurred, the oxide of the calcinable compound, hereinafter referred to as the calcined product, along with combustion gases and flyash produced by the combustion of the solid fuel, are removed from the combustion chamber. It should also be noted at this juncture that, although prior to removal from the chamber a minimal amount of the calcined product may react with sulfur-containing combustion gases in the combustion chamber, such reaction is merely incidental to the calcination step. The removal of sulfur from the combustion gases by the method of the present invention is, as described below, primarily effected outside the combustion chamber to maximize both calcination and sulfur capture.

Referring again to FIG. 1, after the calcined product, flyash and combustion gases are removed from the combustion chamber, the calcined product and flyash are separated from the combustion gases and collected in a collector outside the chamber. Suitable collectors for the calcined product-flyash mixture include, for example, mechanical collectors, baffled hoppers, electrostatic precipitators and baghouses. Preferred collectors include mechanical collectors and baghouses.

As shown in FIG. 1, the collected calcined produce-flyash mixture is next fed from the collector to a pressure hydrator. The mixture is heated and hydrated in the hydrator, preferably by steam heat, to produce an absorbent comprising a crystalline silicate coated with slaked calcined product. It should also be appreciated that, if steam heat is utilized, an increase in pressure may be required should there be a need for steam at a higher saturation temperature. For example, steam heat at 300° F. at 60-70 psig would be suitable.

When heated under suitable conditions, the silica in the flyash dissolves to form a high surface area crystalline silicate and the calcined product slaked during the hydration process is deposited on its crystalline surface. The high surface area of the crystalline structure and the calcium deposits thereon results in a silicate absorbent highly reactive to gaseous sulfur-containing combustion products such as sulfur dioxide and sulfur trioxide.

Referring again to FIG. 1, the absorbent is transported to and retained within a storage bin. When desulfurization of combustion gases is desired, the absorbent is fed by an absorbent feeder from the storage bin to the ductwork carrying the separated combustion gases downstream from the collector. Prior to treatment with the absorbent, however, the temperature of the combustion gases in the ductwork must be lowered relative to their exit temperature from the combustion chamber in order to achieve a satisfactory reaction of the gases with the absorbent. Such cooling can be achieved, for example, by hydrating the combustion gases with water or aqueous solutions which will evaporate and cool the gases. It should be appreciated, however, that in the desulfurization schemes of FIGS. 2 through 4 described below, cooling of the combustion gases can be achieved solely through the recycling of the slaked or moist absorbent.

Upon treatment by the absorbent, the sulfurous components of the combustion gases, such as sulfur dioxide and sulfur trioxide, will react with the absorbent to form solid sulfur-containing products. Although the reaction begins to occur in the ductwork carrying the combustion gases, as shown in FIG. 1, the combustion gases and absorbent are transported to a separation chamber downstream from the point of injection of the absorbent where the reaction is generally completed. As indicated in FIG. 1, any excess flyash, excess and spent absorbent and solid reaction and waste products, herein collectively referred to as "non-gaseous products", are separated from the desulfurized combustion gases in the separation chamber prior to the release of the gases into the atmosphere. Suitable separation chambers for the desulfurization method of the present invention include, for example, baghouses.

Figure 2:
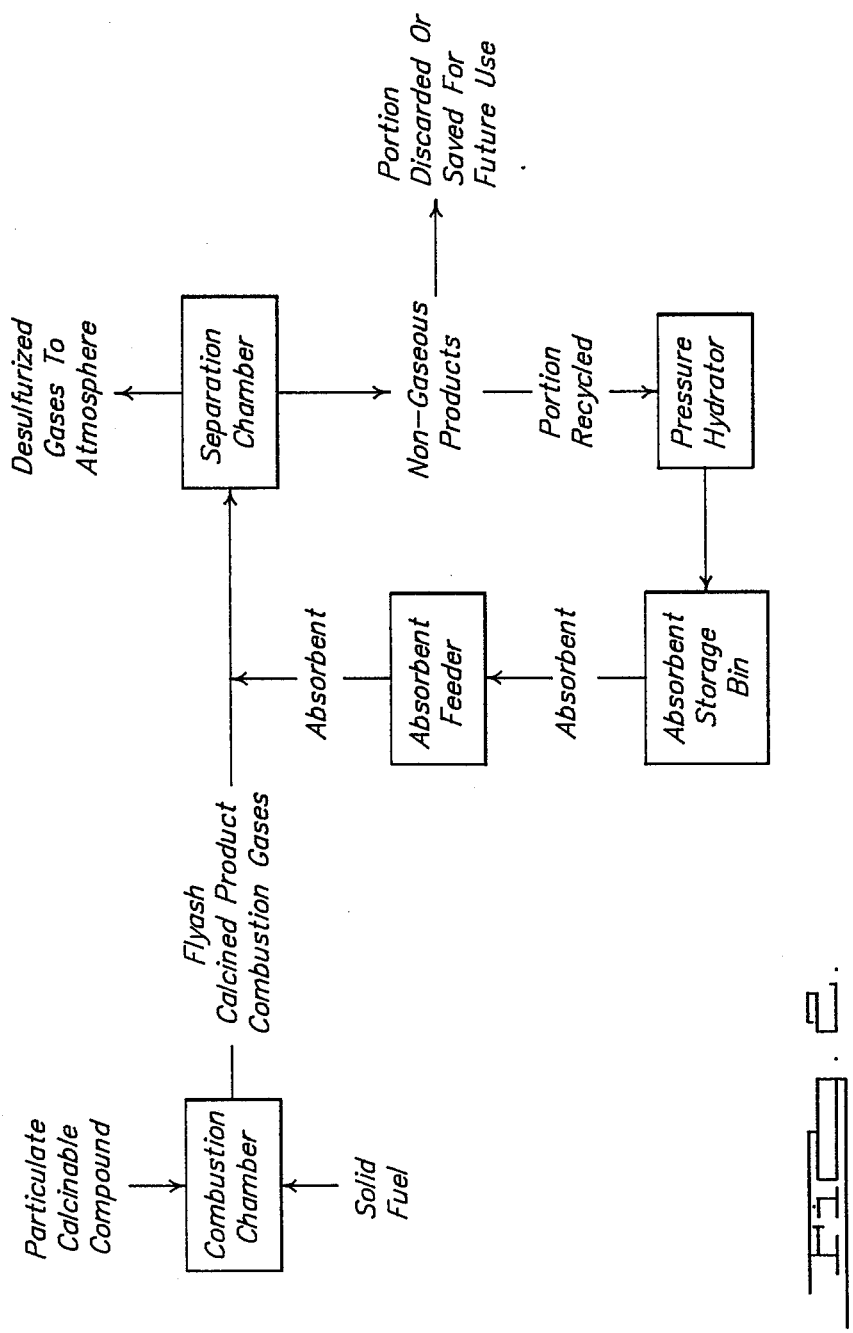
FIG. 2 is a schematic representation of another preferred embodiment of the method of the present invention for desulfurizing combustion gases.

Referring now to FIG. 2, an alternative scheme for desulfurization by the method of the present invention is depicted. AS shown by a comparison of the schematic representations of FIGS. 1 and 2, the desulfurization scheme depicted in FIG. 2 differs primarily in that the flyash and calcined product are not separated from the combustion gases prior to the desulfurization of the gases and that the absorbent is recycled back into the desulfurization cycle.

Referring again to the desulfurization scheme depicted in FIG. 2, the absorbent is fed directly to the ductwork carrying the flyash, calcined product, and combustion gases from the combustion chamber. Thus, as shown in FIG. 2, the separation chamber downstream from the point at which the absorbent is fed into the ductwork will collect flyash, any excess or freshly calcined product, as well as spent and excess absorbent and solid reaction and waste products, hereinafter also collectively referred to as "non-gaseous products". As discussed previously with respect to the scheme of FIG. 1, altough the desulfurization process begins in the ductwork upon injection of the absorbent, the reaction is completed in the separation chamber wheree the non-gaseous products are separated from the desulfurized combustion gases prior to their release into the atmosphere.

After separation from the desulfurized gases, the non-gaseous products are removed from the separation chamber and preferably portioned, with a portion being discarded or saved for future use and a portion being fed back into the cycle. Preferably, the amount of calcined product and absorbent in the portion recycled is such that an equilibrium between the amount of calcinable compound injected and calcined, and the amount of sulfur in the fuel burned that the desired rate of desulfurization is achieved.

Figure 3:
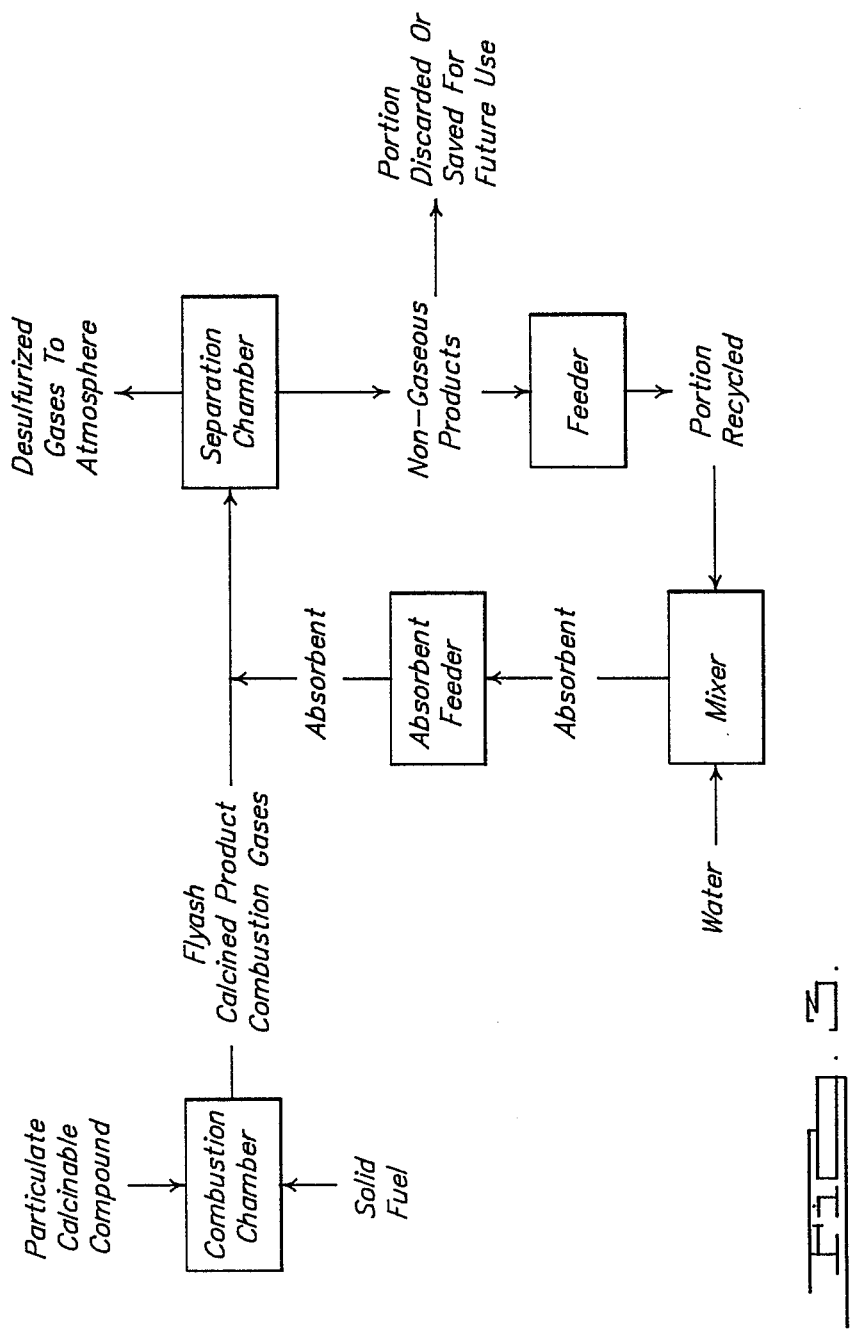
FIG. 3 is a schematic representation of yet another preferred embodiment of the method of the present invention for desulfurizing combustion gases.

Referring now to FIG. 3, a schematic representation of yet another preferred embodiment of the method of desulfurization of the present invention is shown. The scheme of FIG. 3 is similar to that of FIG. 2 in that at least a portion of the non-gaseous products is recycled back into the desulfurization shceme. A major difference, however, between the scheme of FIG. 3 and those of FIGS. 1 and 2 is that the desulfurization scheme of FIG. 3 need not involve pressure hydration of the flyash and calcined product in forming the absorbent. Instead, as shown in FIG. 3, at least a portion of non-gaseous products comprising calcined product and flyash is removed from the separation chamber and forwarded to a mixer where it is mixed with sufficient water to form a moist absorbent dust. The absorbent in this form can then be injected back into the ductwork upstream of the separation chamber where the desulfurization process of the combustion gases begins. Completion of desulfurization and separation of the combustion gases from the non-gaseous products is effected in the separation chamber and the desulfurized gases can then be released into the atmosphere. In the desulfurization scheme of FIG. 3, the separation chamber utilized is preferably a baghouse where a continuing reaction can occur on the bag surfaces, in contrast to, for example, an electrostatic precipitator.

Figure 4:
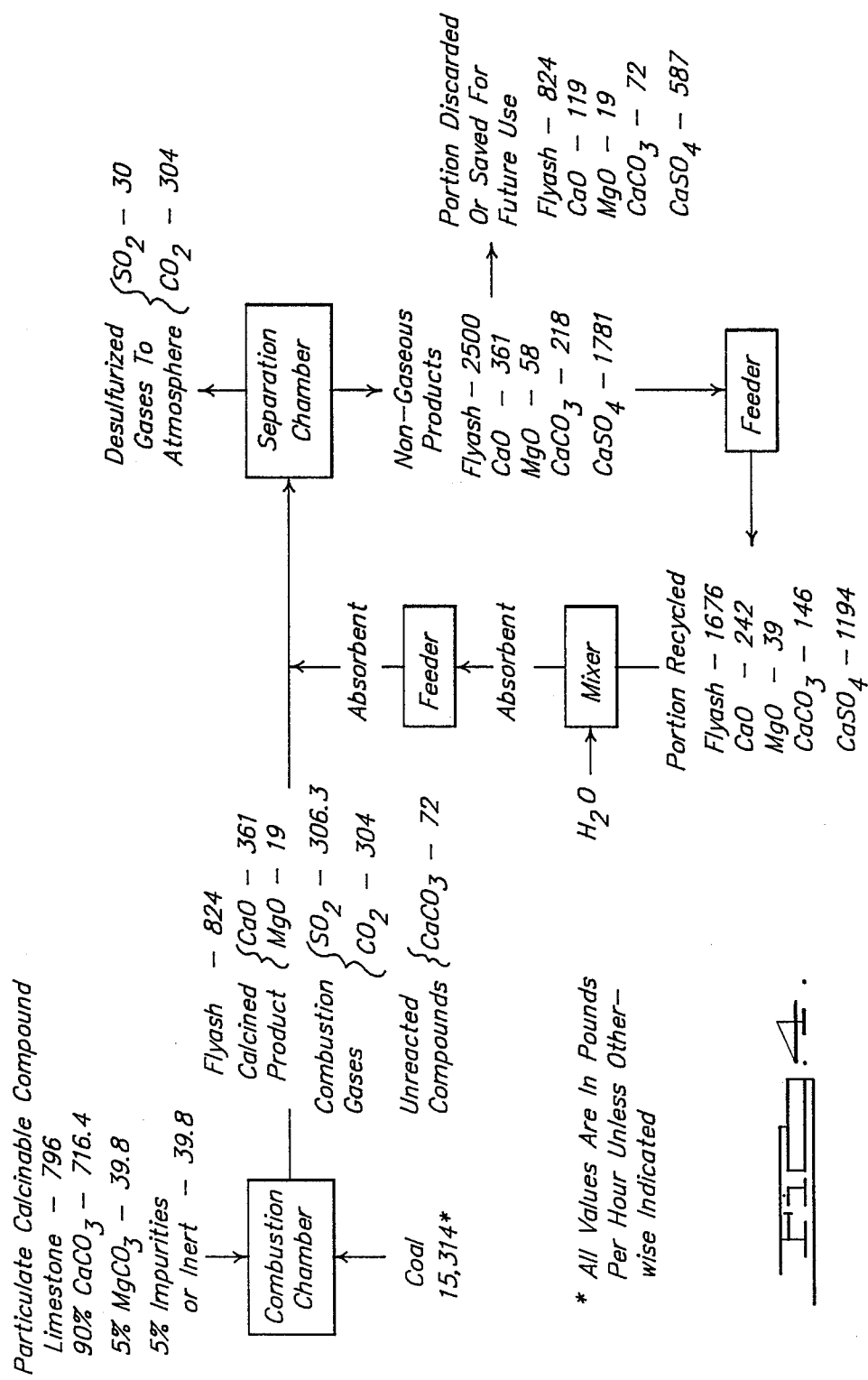
FIG. 4 is a specific example of the method of FIG. 3 for achieving recycling equilibrium.

In the desulfurization scheme depicted in FIG. 3, preferably the amount of calcined product and absorbent recycled is such that the an equilibrium between the amount of calcinable compound injected and calcined, and amount of sulfur in the fuel burned that the desired rate of desulfurization is achieved. Using limestone injected in a coal-fired furnace as a specific example, FIG. 4 gives specific amounts per hour of the components of the desulfurization scheme of FIG. 3 which can be input and recycled to achieve equilibrium, with calcination of over about 90% by weight of the calcium and magnesium carbonates of limestone, and removal of over about 90% by weight of sulfurous gases from the combustion gases released into the atmosphere.

Treatment of combustion gases in accord with the method of the present invention results in substantial desulfurization, wherein about 80% or more by weight of the sulfurous combustion gases can be removed from the gases released into the atmosphere. Thus, the efficiency of desulfurization by the addition and conversion of uncalcined carbonate compounds by the method of the present invention is comparable to that achieved by direct use of precalcined compounds such as lime, yet avoids the high costs attending the use of precalcined compounds.

As will be readily appreciated by those skilled in the art, the method of the present invention can be utilized in conjunction with any solid fuel furnace including spreader stoker fired furnaces, mass burning stoker fired furnaces, underfeeder stoker fired furnaces or pulverized coal fired furnaces. Moreover, although the method of the present invention is ideal for the removal of sulfur-containing gaseous products of combustion such as sulfur dioxide and sulfur trioxide, it will be appreciated that any gaseous pollutant which will react with the absorbent of the present invention can also be removed from combustion gases by the method of the invention. Such gaseous pollutants would include, for example, chlorides, dioxins, furans and oxides of metals, It should be appreciated that a latitude of modification, change and substitution is intended in the foregoing disclosure and, in certain instances, some features of the invention will be employed without a corresponding use of other features. Accordingly, it is appropriate that the appended claims be construed broadly and in a manner consistent with the spirit and the scope of the invention herein.

What is claimed is:

1. A method of desulfurizing gaseous products of combustion comprising the steps of:
    (a) burning a sulfur-containing solid fuel within a combustion chamber to produce flyash and combustion gases comprising a sulfurous gas;
    (b) heating a particulate calcinable compound comprising a compound selected from the group consisting of the carbonates of magnesium, calcium, sodium, and mixtures thereof, in a selected temperature zone within the combustion chamber for a residence time sufficient for calcination of the calcinable compound to its respective oxide, wherein the particle size of the calcinable compound, the selected temperature zone and the residence time are selected to effect calcination of a substantial amount of the calcinable compound to its respective oxide;
    (c) removing the oxide of the calcinable compound from the combustion chamber;
    (d) removing the combustion gases from the combustion chamber; and
    (e) treating the removed combustion gases with the oxide to remove a substantial amount of the sulfurous gas from the combustion gases.

2. The method of claim 1, wherein the oxide of step (e) is provided by the method comprising the steps of:
    removing the flyash from the combustion chamber;
    combining the oxide of step (c) and flyash to form a mixture; and
    hydrating at least a portion of the mixture to produce an absorbent containing the oxide.

3. The method of claim 1, wherein the calcinable compound is the carbonate of calcium.

4. The method of claim 1, wherein the calcinable compound is a mixture of the carbonates of calcium and magnesium.

5. The method of claim 2, wherein steps of removing and combining the flyash and the oxide formed by calcination of the calcinable compound are carried out simultaneously.

6. The method of claim 2, further comprising the step of:
   increasing the moisture content of the combustion gases prior to treatment by the absorbent.

7. The method of claim 3, wherein the selected temperature zone is in the range of from about 1800° to about 2200° F.

8. The method of claim 7, wherein the selected particle size is in the range of from about 10 to about 110 μM in diameter.

9. The method of claim 8, wherein the residence time is in the range of from about 0.10 to about 1.5 seconds.

10. A method of desulfurizing combustion gases produced by the combustion of a solid sulfur-containing fuel, comprising the steps of:
   (a) combusting the solid fuel in a combustion chamber to produce sulfur-containing combustion gases and flyash;
   (b) injecting particles of a calcinable compound having an approximate particle size of about 2000 μm or less in diameter into a preselected temperature zone within the combustion chamber, wherein the temperature zone is selected for calcination of a substantial amount of the compound to its calcined product, and wherein said calcinable compound is a compound or mixture of compounds selected from the group consisting of limestone and dolomite;
   (c) retaining the calcinable compound in the preselected temperature zone for about 2 seconds or less, whereby the calcinable compound is calcined to its oxide within the combustion chamber;
   (d) removing the calcined product, combustion gases and flyash from the combustion chamber;
   (e) separating the calcined product and flyash from the combustion gases removed from the chamber;
   (f) hydrating the calcined product and flyash to form an absorbent; and
   (g) treating the removed sulfur-containing combustion gases with the absorbent to remove sulfur therefrom.

11. The method of claim 10, wherein the preselected temperature zone is from about 1800° to about 2200° F. and the particle size of the particulate calcinable compound or mixture of compounds is in the range of from about 10 μm to about 110 μm in diameter.

12. The method of claim 10, wherein the calcinable compound is limestone.

13. The method of claim 12, wherein the particle size is in the range of from about 74 μm to about 106 μm, the temperature zone is in the range of from about 1900° to about 2100° F., and the residence time is in the range of from about 0.5 to about 1.2 seconds.

14. A method of decreasing the sulfur content of gases produced by the combustion of a sulfur-containing solid fuel, comprising the steps of:
   (a) combusting the sulfur-containing solid fuel in a combustion chamber to produce combustion gases comprising a sulfurous combustion gas and other gases and flyash comprising silica;
   (b) injecting pulverized limestone into the combustion chamber during combustion of the solid fuel at an elevation above the combustion zone where the temperature is in the range of from about 1800° to about 2200° F, wherein the pulverized limestone is of a particulate size of about 110 μm in diameter or less;
   (c) retaining the limestone within the combustion chamber at the elevation of step (b) for a time adequate for at least about 75% of the limestone by weight to calcine to lime;
   (d) removing the lime, flyash and combustion gases from the combustion chamber;
   (e) separating the flyash and lime from the combustion gases and forming a mixture of flyash and lime;
   (f) subjecting the mixture to hydrating conditions to form a moist absorbent comprising flyash and lime; and
   (g) treating the combustion gases with a sufficient amount of the absorbent and for a time adequate to remove at least about 80% of the sulfurous combustion gas from the combustion gases.

* * * * *

UNITED STATES PATENT AND TRADEMARK OFFICE
CERTIFICATE OF CORRECTION

PATENT NO. : 4,867,955

DATED : September 19, 1989

INVENTOR(S) : Neil H. Johnson

It is certified that error appears in the above-identified patent and that said Letters Patent is hereby corrected as shown below:

Column 1, line 21, "combusition" should be -- combustion --.

Column 2, line 68, "ingite" should be -- ignite --.

Column 4, line 1, "produce" should be -- product --.

Column 4, line 57, "AS" should be -- As --.

Column 5, line 7, "altough" should be -- although --.

Column 5, line 9, "wheree" should be -- where --.

Column 5, line 28, "shceme" should be -- scheme --.

Signed and Sealed this

Third Day of December, 1991

Attest:

HARRY F. MANBECK, JR.

*Attesting Officer*      *Commissioner of Patents and Trademarks*